United States Patent [19]
Schulz et al.

[11] Patent Number: 6,071,332
[45] Date of Patent: Jun. 6, 2000

[54] DECORATIVE PREPARATIONS FOR PRODUCING GOLD-CONTAINING DECORATIONS AND THEIR USE

[75] Inventors: Andreas Schulz, Neu-Isenburg; Norbert Giesecke, Hammersbach, both of Germany

[73] Assignee: Cerdec Aktiengesellschaft Kermische Farben, Frankfurt, Germany

[21] Appl. No.: 09/019,927

[22] Filed: Feb. 6, 1998

[30] Foreign Application Priority Data

Feb. 6, 1997 [DE] Germany .......................... 197 04 479

[51] Int. Cl.[7] .................................................. C09D 11/02
[52] U.S. Cl. ..................... 106/31.01; 106/31.05; 106/31.95
[58] Field of Search .............................. 106/31.01, 31.05, 106/31.95; 427/229

[56] References Cited

U.S. PATENT DOCUMENTS

| | | | |
|---|---|---|---|
| 2,610,126 | 9/1952 | Kerridge et al. | 106/31.95 |
| 4,243,604 | 1/1981 | Noltes et al. | 260/430 |
| 4,636,257 | 1/1987 | Baudry et al. | 106/31.95 |
| 5,057,618 | 10/1991 | Herrmann et al. | 556/21 |
| 5,281,635 | 1/1994 | Bishop | 524/93 |
| 5,350,930 | 9/1994 | Schmid et al. | 257/14 |
| 5,401,535 | 3/1995 | Bishop | 427/229 |
| 5,517,338 | 5/1996 | Vaughn et al. | 357/15 |
| 5,589,273 | 12/1996 | Dorbath et al. | 428/433 |

FOREIGN PATENT DOCUMENTS 0 334 176   9/1989   European Pat. Off. .

OTHER PUBLICATIONS

Database WPI, Section ch, 9215 Derwent Publications Ltd., London, GB; Class L02, AN 92–120819 XP002103437 & JP 04 066294 A (Tanaka Kikinzoku Kogyo KK), Mar. 2, 1992.

Database WPI, Section ch, 8147 Derwent Publications Ltd., London, GB; Class A82, AN 81–86237D XP002103438 & JP 56 129269 A (Pentel KK), Oct. 9, 1981.

*Primary Examiner*—Helene Klemanski
*Attorney, Agent, or Firm*—Wenderoth, Lind & Ponack, L.L.P.

[57] ABSTRACT

Decorative preparations according to the invention for producing gold-containing decorations, in particular decorations on fireable substrates, contain as a source of gold a ligand-stabilized gold cluster or a ligand-stabilized gold colloid and also an organic binder and/or an inorganic component from the group consisting of glass frits, silicates, oxides and oxide/silicate precursors. The preferred source of gold is $Au_{55}[(C_2H_5)_2P(m\text{-}C_6H_4SO_3Na)]_{12}Cl_6$ or a gold colloid stabilized with the same phosphane. Bright gold, burnished gold and lustre preparations contain, in addition to the source of ligand-stabilized gold, an organic binder. A decorative preparation for purple decorations generally also contains, in addition to the decorative color consisting of the source of gold and the inorganic components, a medium consisting of an organic binder and a solvent. The decorative preparations are suitable either for producing ceramic decorations or for coloring plastics and lacquers.

22 Claims, No Drawings

DECORATIVE PREPARATIONS FOR PRODUCING GOLD-CONTAINING DECORATIONS AND THEIR USE

SPECIFICATION

The invention relates to new decorative preparations for producing gold-contaning decorations, comprising a source of gold and an organic binder and/or an inorganic component from the group consisting of glasses, oxides, silicates and oxide- and silicate-forming precursors. Decorative preparations according to the invention can be used to produce bright gold and burnished gold decorations, purple decorations and luster glazed decorations with different shades of color.

BACKGROUND OF THE INVENTION

Decorative preparations for producing gold-containing decorations from substrates which can be fired such as glass, porcelain and other ceramic substances, are known. These are, inter alia, so-called bright gold and burnished gold preparations which can be used to produce high-gloss or silk matt gold film decorations. Preparations with similar compositions and lower gold contents, and frequently also a concentration of dissolved compounds of other metals, such as in particular those of Ti, V, Cr, Fe, Co, Ni, Sn, Bi and Zr, are used as luster preparations which have an iridescent lustrous glaze with a color which depends on the metal composition. Finally, purple decorative colors and the preparations containing these are also known, these containing colloidal gold in and/or on an inorganic matrix, in particular glass fluxes, as the color-providing component.

Bright gold, burnished gold and luster preparations contain a gold compound in dissolved form, in a liquid support medium whose main components are an organic binder and a solvent. These gold compounds are generally gold(I) thiolates and gold sulphoresinates. Whereas gold thiolates and gold sulphoresinates, which are only soluble in organic solvents, were previously available for the purpose mentioned above, now water-soluble gold(I) thiolates are also known; reference is made here, for example, to EP-A 0 514 073 and EP-A 0 688 265 in which these types of thiolates in bright gold and burnished gold preparations and their composition are specifically disclosed. Burnished gold preparations often also contain gold powder and/or an insoluble gold compound. The decorative preparations mentioned also generally contain fluxes and auxiliary agents to adjust the processing and wear properties. The fluxes are in particular soluble compounds of the elements B, Si, V, Cr, In, Zn, Sb, Bi and Rh, wherein in particular Rh has a beneficial effect on the gloss and Cr and Bi have a beneficial effect on adherence of the gold film to the substrate. Although a person skilled in the art already has a wide range of gold(I) thiolates available, there is also interest in new sources of gold for use in the preparations mentioned above.

Decorative preparations with a purple pigment based on colloidal gold have been known for a long time. The methods of manufacture are sometimes very expensive and/or do not lead to sufficiently thermally stable pigments which results in discoloration of the colors at high firing temperatures, in particular above 1000° C. For example, reference is made here to DE-A 44 11 103, also to German patent application 196 49 067.7 which has not yet been published.

DESCRIPTION OF THE INVENTION

The object of the invention is to provide new gold-containing decorative preparations. The decorative preparations are intended to be used either to produce bright gold and burnished gold films or decorations with a luster glaze and/or a purple color by varying the concentration and the additives used.

A decorative preparation for producing gold-containing decorations, in particular decorations on substrates which can be fired, including a source of gold and an organic binder and/or an inorganic component from the group consisting of glasses, oxides, silicates and oxide- and silicate-forming precursors, except for polyethylenimine coated mica, has been found which is characterized in that it contains, as a source of gold, a ligand-stabilized gold cluster or a ligand-stabilized gold colloid in an amount of up to 40 wt. %, calculated as gold.

Preparations without any or with only a small amount of the inorganic components mentioned are in particular bright gold and burnished gold and luster preparations; these types of preparations usually also contain a solvent. A preparation which contains an appreciable amount of at least one of the inorganic components mentioned is a purple decorative color which is made into a paste with a liquid medium which contains a solvent and binder for the purposes of application. The inorganic component assumes the function of a matrix for the color-providing Au colloid and also the function of a flux which becomes an essential constituent of the decorative layer during firing.

The essence of the decorative preparation according to the invention is its concentration of gold in the form of a ligand-stabilized gold cluster or a ligand-stabilized gold colloid. This source of gold has hitherto never been considered for use in decorative preparations. A gold thiolate or gold sulphoresinate has hitherto been used for bright gold and burnished gold preparations. Although purple pigments containing colloidal gold have been known for a long time, ligand-stabilized gold clusters or gold colloids have never been used. The stabilization of Au clusters and Au colloids using selected ligands facilitates their use for preparing stable, readily-reproducible preparations. At the same time the range of gold-containing decorative preparations and the opportunities for their manufacture is extended. The principle according to the invention makes gold preparations with different compositions and completely different decorative effects accessible, while using the same source of gold.

The gold content of decorative preparations according to the invention in a form ready for application (e.g. suitable for silk-screen printing) can vary between wide limits, that is between about 0.01 and about 40 wt. %. Burnished gold preparations generally contain the highest amount of Au, but, surprisingly, high-gloss burnished gold preparations with less than 10 wt. % of Au can also be obtained according to the invention. Bright gold preparations generally have an Au concentration in the range from 2 to 20 wt. %, in particular 5 to 15 wt. %. To produce luster and purple decorations, the preparations contain 0.05 to 10 wt. %, generally however only 0.1 to 2 wt. % of Au.

Ligand-stabilized gold clusters and ligand-stabilized gold colloids may contain very different ligands. The stabilizing ligands may be monomers or polymeric compounds. Polymeric compounds which may be mentioned are for example polyethylenimine, polyvinyl alcohol, gelatins, albumin and polyvinyl imidazole. In an individual case, it has to be tested beforehand whether sufficient stabilization and solubility is provided for the cluster or colloid. Examples of monomeric ligand stabilizers are phosphanes, amines and N-heteroaromatic compounds such as phenanthroline and derivatives thereof.

Phosphanes, in particular the well-known triaryl phosphanes of the general formula

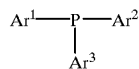

(=Ar¹P(Ar³)Ar²) now used for stabilizing Au clusters and Au colloids are preferred as ligand stabilizers, wherein the aryl groups $Ar^1$, $Ar^2$ and $Ar^3$ are identical or different and $Ar^1$ and $Ar^2$ may also be linked in the ortho-position either directly or via a methylene or ethylene group and are selected from the group consisting of phenyl and singly or doubly, meta and/or para, substituted phenyl, wherein the substituents are selected from the group consisting of methyl, ethyl, methoxy, ethoxy, $SO_3H$, $SO_3Me$, COOH and COOMe, where Me represents Li, Na, K, $NH_4$ or mono-, di-, tri-, or tetra-($C_1$–$C_4$)-alkylammonium.

Phosphanes from the group consisting of $P(phenyl)_3$, $P(p$-$tolyl)_3$, $(P(p$-$anisyl)_3$, $(phenyl)_{3-n}P(m$-$C_6H_4SO_3H)_n$ and $(phenyl)_{3-n}P(m$-$C_6H_4SO_3Me)_n$, in which n is 1, 2, or 3 and Me is defined as above, are particularly preferred.

Particularly preferred ligand-stabilized gold clusters which are used in the decorative preparations according to the invention have the formula $AU_{55}[L]_{12}X_6/_m$ wherein L represents one of the phosphanes mentioned above and X represents an anion with the valency m; X is preferably chloride. Gold clusters which are used in particular for aqueous decorative preparations are those with phosphane ligands which contain one or more solubilizing substituents, in particular one or more sulphonate groups.

These types of ligand-stabilized gold clusters and gold colloids are known—see G. Schmid et. al. in Polyhedron vol. 7, (1988), pp. 605–608 and Z. anorg. allg. Chem. 621 (1995), pp. 1147–1152.

Angew. Chem. 107 (1995), pp. 1168–1169 discloses monolayers of ligand-stabilized $AU_{55}$ clusters with the ligands $(C_6H_5)_2P(m$-$C_6H_4SO_3H)$ on mica coated with polyethylenimine. However, this document does not disclose in any way the use of these types of ligand-stabilized gold clusters for decorative preparations.

Gold colloids stabilized with phosphane ligands are known from Angew. Chem. 101 (1989), pp. 773–774. Stabilization enables a solution of the colloid to be evaporated and the residue taken into solution again without coagulation taking place. Whereas preferred phosphane-stabilized gold clusters have a particle diameter of 2.2 nm (with ligands) or about 1.4 nm (without ligands), the average particle diameter of the ligand-stabilized gold colloids is generally in the range 10 to 30 nm. There is a continuous transition from gold clusters to gold colloids although hitherto no intermediates have been isolated. Reference is made to the previously-mentioned documents for the preparation of solutions of ligand-stabilized Au clusters and Au colloids; the solutions are preferably aqueous.

Decorative preparations according to the invention may contain conventional organic binders such as are generally known in the specialist field within the context of preparing bright gold, burnished gold, luster-finish and conventional colored decorations. They are generally polymeric organic binders which endow the decoration in the non-fired condition with sufficient adhesion and resistance to handling, but burn away completely during firing of the decorative material. Suitable polymers which are present in dissolved or dispersed form in the decorative preparation may be homopolymers, copolymers or block polymers such as those based on polyacrylate and polymethacrylate resins, polyvinylpyrrolidone (PVP), cellulose ethers, polyamides, polyethylene glycol, polyesters, polyacrylamides, polyvinyl acetate, polyvinyl alcohol, polyurethane resins, alkyd resins and polyamines as well as mixtures thereof. The resins, in particular if they are used in aqueous systems, may contain solubilizing groups such as carboxylate, sulphonate, hydroxy and/or amino or ammonium groups. PVP, polymethacrylates and cellulose ethers are particularly preferred for aqueous systems.

The inorganic components which are contained in accordance with one variant in the decorative preparations according to the invention are a variety of different glasses, metal oxides and silicates as well as oxide and silicate-forming precursors of elements from the group consisting of Al, Si, Sn, Ti, Zr, Nb, Ta, Sc, Y, La, Ce and Zn. The precursors are in particular hydrated oxides and gels or xerogels of the elements mentioned produced by a sol-gel process. The inorganic components may be used in the form of very finely divided particles, expediently with an average particle diameter of 1 to 20 mm, in particular 1 to 10 mm, and as narrow as possible a size spectrum and/or have been produced by a precipitation reaction or in a sol-gel process during production of the decorative preparation.

Examples of the finely divided particles mentioned are finely milled glass frits, natural and synthetic silicates such as aluminosilicates, also firing-resistant metal oxides and mixed oxides such as $SiO_2$, $ZrO_2$, $TiO_2$, $SnO_2$ and colorless spinels. Finely milled glass frits are particularly preferred because these are obtainable in very different chemical compositions and with different physical properties and can easily be matched to the substrate to be decorated. This avoids defects in the decorations.

Oxide and silicate-forming precursors of the previously mentioned elements, of which Si, Zr, Ti, Al and in particular Sn are preferred, produced in-situ during production of the decorative preparation, are the result of a precipitation reaction or of conversion of a sol into a gel of soluble compounds of the metals mentioned above. Precipitation generally takes place by adjusting the pH to a final pH in the range of about 1 to 10; at the end of precipitation a pH in the range of 4 and 10, in particular in the range of 6 and 9 is preferred.

Soluble metal compounds used in the process are those which can be precipitated as hydrated oxides or oxide-forming gels in an aqueous or aqueous/organic phase by condensation or hydrolysis with subsequent condensation and/or by altering the pH. Suitable soluble compounds are for example tin(IV) chloride and hydrates thereof, tin(IV) sulphate dihydrate; $AlCl_3$, aluminum acetate, aluminum sulphate, aluminum nitrate; zirconium(IV) sulphate tetrahydrate, $Zr(NO_3)_4$, zirconyl chloride hydrate; chlorides, nitrates or acetates of scandium, yttrium, lanthanum, cerium or zinc; water-soluble silicates, in particular water glass; titanyl sulphate. Preferred sources of oxide-forming gels of Si, Ti, Zr are monomeric and oligomeric alkoxy compounds of these elements, wherein the alkoxy groups preferably contain 1 to 3 carbon atoms, and additional OH groups and oxygen bridges between two metal atoms may be present in addition to alkoxy groups. Examples are $Si(OC_2H_5)_4$, $Ti(OC_2H_5)_4$, $Zr(C_2H_5)_4$, $(HO)_{n-3}(C_2H_5)_n Si$—O—$(C_2H_5)_n(OH)_{n-3}$, where n=1, 2 or 3.

The decorative preparations generally contain, if they are to be applied by conventional printing, coating, or painting techniques, a solvent system, wherein this expression also includes mixtures of solvents. Either organic or aqueous/organic and substantially purely aqueous systems may be used. The choice of solvent is governed by the solubility of the ligand-stabilized source of gold and by the solubility of the organic binder. Solvent and organic binder are the essential constituents of conventional printing media. Solvents which may be mentioned are for example water, water-soluble monohydric lower alcohols, glycols, glycol ethers, ketones, esters, chlorinated hydrocarbons, aromatic and cycloaliphatic hydrocarbons and ethereal oils. Water and aqueous/organic solvent mixtures are increasingly preferred.

A solvent-free or low-solvent decorative preparation which contains, in addition to a ligand-stabilized Au cluster or Au colloid, substantially only an inorganic component from the group consisting of glass frits, oxides, silicates and oxide or silicate-forming precursors, may be called a decorative color or purple pigment and be used either to color a variety of materials including plastics and lacquers or for preparing ceramic decorations. Printable decorative preparations for purple decorations generally contain a decorative color, that is a preparation comprising substantially the ligand-stabilized Au cluster or Au colloid and an inorganic flux, and a printing medium containing substantially a binder and solvent in the ratio by weight in the range 0.2 to 4, preferably 0.5 to 2.

The proportion of polymeric binders in the preparations for bright gold, burnished gold and luster decorations is usually in the range 3 to 45 wt. %, preferably between 3 and 20 wt. %. The ratio by weight of binder to noble metal is conventionally in the range between 0.1 to 2, preferably between 0.2 and 1. The solvent content of the preparation is generally between 10 and 90 wt. %, preferably 30 to 80 wt. %. Preferred preparations are aqueous and contain no or only a very small amount of one or more organic solvents. Another exemplary decorative preparation for producing a lustre glaze decoration on a fireable substrate consists substantially of a ligand-stabilized Au cluster or a ligand-stabilized Au colloid in an amount of 0.05 to 5 wt. %, calculated as gold, a solvent for this, a polymeric binder and 0 to 10 wt. % calulated as metal, of at least one compound of the elements selected from the group consisting of Ti, V, Cr, Fe, Co, Ni, Sn, Bi, Zr dissolved in the solvent and also at least one conventional auxiliary agent in an effective amount to produce the flow and drying properties, firing stability, adhesion, shade of color and gloss required for application.

Bright gold preparations may also contain, in addition to the ligand-stabilized Au cluster or Au colloid to be used according to the invention, a known gold(I) thiolate or gold sulphoresinate, also shade-modifying dissolved compounds of other noble metals, in particular Ag, Pt, Pd. Burnished gold preparations may also contain gold powder. The frequently-used auxiliary agents for adjusting the drying and wear properties of the preparation and auxiliary agents for increasing adhesion of the glaze and the thermal stability of the gold film are selected from the group of known substances and are used in effective amounts.

Preparations for producing purple decorations may contain a fireable material on its own as the inorganic component. These types of product, however, are less suitable for high temperature firing at above 1000° C. to 1400° C. because they discolor with increasing temperature. Preparations suitable for high temperature firing contain the source of gold in a matrix consisting of an oxidic or silicate material or a precursor thereof, such as a hydrated oxide, produced by co-precipitation or by a sol-gel process. When using the co-precipitation or sol-gel process mentioned a finely-divided fireable material may also be present; decorative preparations obtainable in this way are also characterized by high resistance to high temperature firing.

Production of the decorative preparations according to the invention is simple. It comprises the following steps: preparing a solution of a ligand-stabilized Au cluster or a ligand-stabilized Au colloid and adding an organic binder and/or one or more inorganic components from the group consisting of glass frits, oxides, oxide and silicate-forming precursors and silicates, wherein the precursors mentioned may be produced in situ from soluble metal compounds. To prepare bright gold, burnished gold and luster presents already described in detail are mixed and homogenized. With the exception of burnished gold preparations which may also contain gold powder and/or insoluble gold compounds, the individual components in these types of preparations are dissolved in the system.

To produce preparations for purple decorations the solution of the source of gold is combined with the inorganic component(s), such as a glass frit. Purple pigments are obtained by evaporating off the solvent. It is better to feed the suspension which contains a ligand-stabilized gold cluster or gold colloid and a support material to a co-precipitation or a sol-gel process. The principle and the many variants of performing co-precipitation and the sol-gel process to coat finely-divided particles with oxidic and silicaceous materials has been known in the specialist field for a long time; reference is made to DE 196 25 658 and DE 197 39 124.9 for example. Here, for example, the previously-mentioned suspension containing a solution of a soluble metal compound forming the matrix is combined with a precipitation agent, usually a base, and co-precipitation is terminated at a pH in the range 1 to 10. The co-precipitate, a purple colorant, may be isolated and dried. According to one alternative, the purple colorant may also be prepared by a sol-gel process wherein a metal compound from the group consisting of tetraalkoxysilanes, alkyltrialkoxysilanes, tetraalkoxytitanates, tetraalkoxyzirconates, partially hydrolyzed substances from the alkoxy compounds mentioned, zirconyl chloride hydrates, water glass and tin(IV) sulphate hydrates is used as the oxide and/or silicate forming precursor, dissolved in a solvent; in the presence of water, hydrolysis and condensation may occasionally take place.

An advantage of the decorative preparations according to the invention is that they always contain the same source of gold, although they produce different decorative effects. The decorative preparations can be optimized to the particular ultimate application using very simple means.

The invention is explained in more detail using the following examples.

EXAMPLES 1 AND 2

Production and Application of Purple Decorative Preparations.

0.13 g of ligand-stabilized gold clusters of the formula $Au_{55}[(C_6H_5)_2P(meta-C_6H_4SO_3Na)]_{12}Cl_6$ (=TPPMS-Na) were dissolved in 50 ml of water and stirred for 30 minutes at 20° C. Then 2.91 g of a glass flux was added and stirring continued for a further 30 minutes. The solvent was removed on a rotary evaporator and the purple decorative preparation was dried.

To produce a purple decoration, the decorative preparation was made into a paste in the conventional way with a silk-screen printing medium (No. 80820 from Cerdec AG), printed onto a transfer paper with a 140 S screen and coated with film solution (No. 80450 from Cerdec AG). The transfer image was applied to porcelain and fired at a rate of heating of 400 K/hr with a residence time of 0.2 hours at 800° C.

|             | Example 1                              | Example 2                                  |
| ----------- | -------------------------------------- | ------------------------------------------ |
| Glass flux  | lead-free glass frit (No. 10163/Cerdec A6) | lead-containing glass frit (No. 10136/Cerdec A6) |
| Ratio by weight of decorative preparation to medium | 2.5/2.5 | 3.0/2.4 |
| Color index according to CIE lab (DIN 5033, Part 3) | L* 53.34<br>a* 26.20<br>b* −2.20 | L* 49.01<br>a* 24.43<br>b* −4.47 |

EXAMPLE 3

Producing and applying a bright gold preparation

A paste was prepared with the composition given below:

| Gold cluster (TPPMS-Na) | 0.353 g |
| Water | 1.790 g |
| N(C_2H_5)_3 | 0.137 g |
| Adhesive and glazing auxiliary agent based on Rh, Cr and Bi salts | 0.015 g |
| Polyvinylpyrrolidone | 0.220 g |
| Ammonium polysulphide | 0.075 g |
| Anionic surfactant | 0.012 g |

The gold content of the paste was 9.70%, the residue 9.97%.

In order to achieve printability, the paste was diluted with water to 6.2% residue. The diluted paste (=bright gold preparation) was applied to porcelain and fired: heating-up time 1 hour, residence time at 820° C. 10 minutes. A bright gold film was obtained.

By diluting the paste with ethanol to a concentration corresponding to a residue of about 1.45 wt. %, applying to porcelain and firing (same conditions as above), a matt gold film was obtained when a thick layer was applied and a purple, glossy, lustre decoration was obtained when a thin layer was applied.

EXAMPLE 4

A burnished gold preparation with the following composition was prepared:

| Gold cluster (TPPMS-Na) | 0.135 g |
| Water | 1.814 g |
| Adhesive and glazing auxiliary agent based on Rh, Cr and Bi salts | 0.006 g |
| Polyvinylpyrrolidone | 0.636 g |
| (NH_4)_2S_x | 0.010 g |
| Surfactant (non-ionic) | 0.009 g |

The paste contained 9.556 wt. % of Au.

After applying the paste to porcelain it was fired—1 hr heating-up time, 10 min. residence time at 820° C. A decoration in the form of a gold film which could be polished was obtained. This paste was therefore suitable as a low percentage burnished gold preparation.

What is claimed is:

1. A decorative preparation for producing gold-containing decorations, which comprises:

a source of gold, and an organic binder and/or an inorganic component selected from the group consisting of a glass, an oxide, a silicate and an oxide- or silicate-forming precursor, with the exception of polyethylenimine-coated mica, which preparation contains, as the source of gold, a ligand-stabilized gold cluster in an amount of 0.01 to 40 wt. % calculated as golds, wherein the ligand-stabilized gold cluster has the formula $Au_{55}(L)_{12}X_{6/m}$, in which L represents a ligand selected from the group consisting of a phosphane of the formula $Ar^1P(Ar^3)Ar^2$.

wherein $Ar^1$, $Ar^2$ and $Ar^3$ are identical or different aryl groups, and

X represents an anion with the valency m.

2. A decorative preparation according to claim 1, wherein the gold cluster is ligand-stabilized with a phosphane of the formula $Ar^1P(Ar^3)Ar^2$, wherein the aryl groups $Ar^1$, $Ar^2$ and $Ar^3$ are identical or different and $Ar^1$ and $Ar^2$ may also be linked, either directly or via a methylene or ethylene group, in the ortho-position, and are selected from the group consisting of phenyl and singly or doubly, meta and/or para, substituted phenyl, wherein the substituents are selected from the group consisting of methyl, ethyl, methoxy, ethoxy, $SO_3H$, $SO_3Me$, COOH and COOMe, where Me represents Li, Na, K, $NH_4$ or mono-, di-, tri- or tetra-$(C_1-C_4)$-alkylammonium.

3. A decorative preparation according to claim 1, wherein the phosphane is selected from the group consisting of $P(phenyl)_3$, $P(p-tolyl)_3$, $P(p-anisyl)_3$, $(phenyl)_{3-n}P(m-C_6H_4SO_3H)_n$ and $(phenyl)_{3-n}P(m-C_6H_4SO_3Me)_n$, in which n is 1, 2 or 3 and Me represents Li, Na, K, $NH_4$ or mono-, di-, tri- or tetra-$(C_1-C_4)$-alkylammonium.

4. A decorative preparation according to claim 1, wherein X is chloride.

5. A decorative preparation according to claim 1, which contains a gold cluster having an average diameter in the range of 10 to 30 nm.

6. A decorative preparation for producing a bright gold or burnished gold decoration on a fireable substrate according to claim 1, which consists substantially of a ligand-stabilized Au cluster in an amount of 2 to 40 wt. %, for bright gold preparations calculated as gold, a solvent and a polymeric organic binder and optionally also a Au(I) thiolate, a gold sulphoresinate and/or gold powder and at least one conventional auxiliary agent for producing the required flow and drying properties, firing stability, shade of color, adhesion and gloss in effective amounts.

7. A decorative preparation for producing a purple decoration on a fireable substrate according to claim 1, which consists substantially of a ligand-stabilized Au cluster in an amount of 0.05 to 10 wt. %, calculated as gold, and at least one inorganic component selected from the group consisting of a glass, an oxide, a silicate and an oxide- or silicate-forming precursor.

8. A decorative preparation according to claim 7, wherein the amount of the ligand-stabilized Au cluster is 0.1 to 2 wt. %.

9. A decorative preparation according to claim 7, which consists substantially of a ligand-stabilized Au cluster coated with a silicate and/or oxide precursor by means of a sol-gel process or co-precipitation and optionally also contains a support material selected from the group consisting of a fireable material.

10. A decorative preparation according to claim 9, wherein the fireable material is a glass frit.

11. A decorative preparation according to claim 7, which also contains a polymeric organic binder and a liquid medium containing a solvent to adjust the printing or painting properties required.

12. A decorative preparation according to claim 1, for producing a lustre glaze decoration on a fireable substrate, which consists substantially of a ligand-stabilized Au cluster in an amount of 0.05 to 5 wt. %, calculated as gold, a solvent for this, a polymeric binder and 0 to 10 wt. %, calculated as metal, of at least one compound of the elements selected from the group consisting of Ti, V, Cr, Fe, Co, Ni, Sn, Bi, Zr dissolved in the solvent and also at least one conventional auxiliary agent in an effective amount to produce the flow and drying properties, firing stability, adhesion, shade of color and gloss required for application.

13. A decorative preparation for producing gold-containing decorations, which comprises:

a source of gold, and an organic binder and/or an inorganic component selected from the group consisting of a glass, an oxide, a silicate and an oxide- or silicate-forming precursor, with the exception of polyethylenimine-coated mica, which preparation contains, as a source of gold, a ligand-stabilized gold cluster or a ligand-stabilized gold colloid in an amount of 0.01 to 40 wt. % calculated as gold, wherein the ligand-stabilized gold cluster or ligand-stabilized gold colloid is a water-soluble gold cluster or water-soluble gold colloid with a stabilizing phosphane ligand of the formula $(phenyl)_{3-n}P(m-C_6H_4SO_3H)_n$ or $(phenyl)_{3-n}P(m-C_6H_4SO_3Me)_n$ where n is 1, 2 or 3, and Me represents Li, Na, K, $NH_4$ or mono-, di-, tri- or tetra-$(C_1-C_4)$-alkylammonium.

14. A decorative preparation according to claim 13, wherein n is 1 and Me is Na.

15. A decorative preparation according to claim 13, wherein the amount of the ligand-stabilized Au cluster or Au colloid is 5 to 15 wt. %.

16. A process for producing a decorative preparation, which comprises the step of:

mixing a source of gold and an organic binder and/or an inorganic component selected from the group consisting of a glass, an oxide, a silicate and an oxide- or silicate-forming precursor, with the exception of polyethylenimine-coated mica, wherein the source of gold is a ligand-stabilized gold cluster or a ligand-stabilized gold colloid in an amount of 0.01 to 40 wt. % calculated as gold, to thereby obtain the decorative preparation, wherein the preparation contains at least one oxide and/or silicate-forming precursor selected from the group consisting of a tetraalkoxysilane, an alkyltri-alkoxysilane, a tetraalkoxytitanate, a tetraalkoxyzirconate, a partially hydrolyzed substance of the alkoxy compounds mentioned, a zirconyl chloride hydrate, a water glass and a tin(IV) sulphate hydrate, and wherein the preparation is produced by co-precipitation or gelling of the ligand-stabilized Au cluster or ligand-stabilized Au colloid dissolved in a solvent and a precipitation or gelling agent.

17. A decorative preparation for producing gold-containing decorations, which comprises:

a source of gold, and an organic binder and/or an inorganic component selected from the group consisting of a glass, an oxide, a silicate and an oxide- or silicate-forming precursor, with the exception of polyethylenimine-coated mica, which preparation contains, as the source of gold, a ligand-stabilized gold cluster in an amount of 0.01 to 40 wt. % calculated as gold, wherein the ligand-stabilized gold cluster has the formula $Au_{55}(L)_{12}X_{6/m}$, in which L represents a ligand selected from the group consisting of a phosphane of the formula $Ar^1P(Ar^3)Ar^2$, wherein $Ar^1$, $Ar^2$ and $Ar^3$ are identical or different aryl groups and $Ar^1$ and $Ar^2$ may also be linked, either directly or via a methylene or ethylene group, in the ortho-position, and are selected from the group consisting of phenyl and singly or doubly, meta and/or para, substituted phenyl, wherein the substituents are selected from the group consisting of methyl, ethyl, methoxy, ethoxy, $SO_3H$, $SO_3Me$, COOH and COOMe, wherein Me represents Li, Na, K, $NH_4$ or mono-, di-, tri- or tetra-$(C_1-C_4)$-alkylammonium, and X represents an anion with the valency m.

18. A method for decorating a fireable substrate with a gold film, lustre or purple decoration, which comprises applying to the substrate a decorative preparation as defined in claim 1, 13, or 17, and subsequently firing the substrate.

19. A method according to claim 18 wherein the fireable substrate is glass, porcelain or a ceramic.

20. A method for coloring a plastic or lacquer, which comprises incorporating into said plastic or lacquer a decorative preparation as defined in claim 1, 13 or 17.

21. An article produced according to the method of claim 18.

22. An article produced according to the method of claim 20.

* * * * *